MULTICONDUCTOR TERMINAL FRAME WITH WIRE HARNESSING MEANS

Filed July 21, 1961 2 Sheets-Sheet 1

INVENTORS
G. E. MURRAY
V. A. RAYBURN
C. W. RICE, JR.
BY S. Gundersen
ATTORNEY

Oct. 6, 1964 G. E. MURRAY ETAL 3,152,219

MULTICONDUCTOR TERMINAL FRAME WITH WIRE HARNESSING MEANS

Filed July 21, 1961 2 Sheets-Sheet 2

INVENTORS
C. E. MURRAY
V. A. RAYBURN
C. W. RICE, JR.

BY S. Gundersen
ATTORNEY

United States Patent Office 3,152,219
Patented Oct. 6, 1964

3,152,219
MULTICONDUCTOR TERMINAL FRAME WITH WIRE HARNESSING MEANS

Guy E. Murray, Towson, Vincent A. Rayburn, Baltimore, and Carl W. Rice, Jr., White Marsh, Md., assignors to Western Electric Company, Incorporated, New York, N.Y., a corporation of New York Filed July 21, 1961, Ser. No. 125,824
5 Claims. (Cl. 174—72)

This invention relates to a multiconductor terminal frame and particularly to a multiconductor terminal frame for communication apparatus, the frame being provided with means for securing a cable or wires thereto and for terminating the wires.

Telephone apparatus, such as key telephone systems, referred to in the trade as "call directors," for selectively interconnecting a plurality of telephone subscriber sets, have multiple conductor cables extending from a key telephone set which are connected to a common control apparatus. Certain of the individual conductors of the cable on the key telephone set end of the cable are connected to individual terminals of multiple plug connectors, which are mounted in place in a multiconductor terminal frame of the key telephone set. Heretofore, the multiconductor terminal frames were stamped out of sheet metal and flat, plastic terminal strips, such as phenol fiber strips, having staked-in metal eyelets, were attached in spaced, parallel relationship transversely on the terminal frame. In order to secure multiple conductor cables to the terminal frame, it was necessary to encircle the cable and the frame with nylon ties. This type of terminal frame presented numerous problems, such as occasional displacement of the cable from the frame, due to slippage of the ties, and electrical short circuiting between the plug connectors and the metal portions of the frame, and also between tips of the wires attached to adjacent sets of eyelets.

An object of this invention is a new and improved multiconductor terminal frame.

Another object of this invention is a new and improved terminal frame having new and improved means for attaching a mupltiple conductor cable to the frame.

A terminal frame illustrating certain features of the invention may include a block, means on the block for terminating a plurality of fanned out conductors of the cable, and at least one detachable strap adapted to be formed in encircling and bundling arrangement with the cable conductors, the block being provided with at least one socket for detachably securing one end of the strap to the block and at least one aperture for lockingly receiving the other end of the strap in the block so that a strap having said one end detachably secured in the socket and said other end received in the aperture forms a loop about a selected group of cable conductors, the size of the loop being reducingly adjustable to form a relatively closely fitting loop about said group of cable conductors to secure the cable conductors to the block.

According to an important feature of the invention, molded, sloped, identifying bosses on the frame identify and insulatingly separate tips of the conductors of the cable fastened to the block.

An understanding of the invention may be obtained from the following detailed description of a specific embodiment thereof, when read in conjunction with the appended drawing in which.

Figure 1:
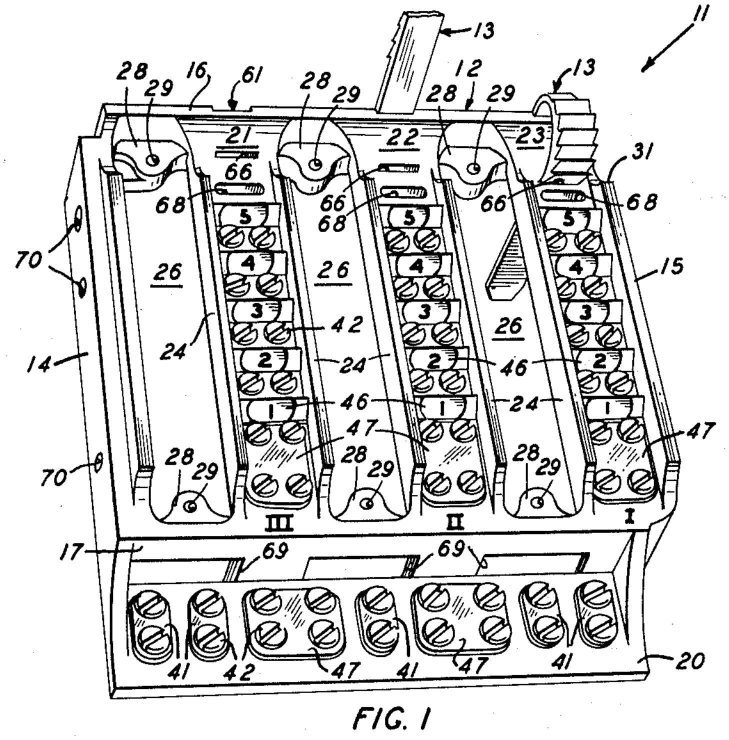
FIG. 1 is a perspective view of a terminal frame.
Figure 2:
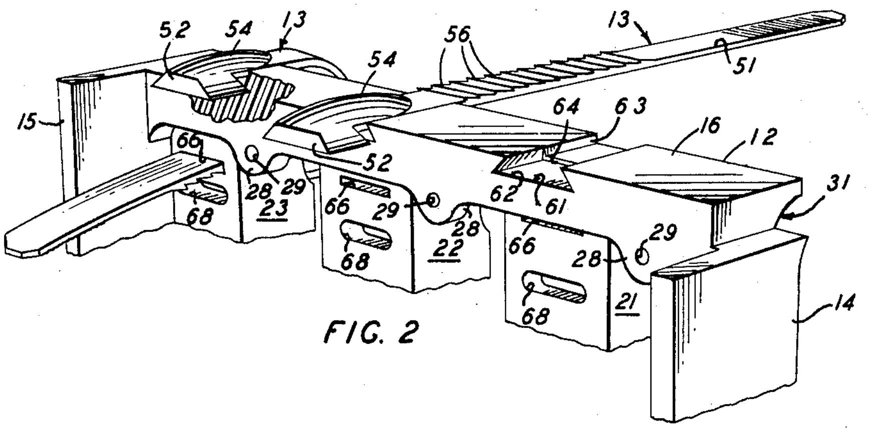
FIG. 2 is an enlarged, fragmentary, perspective view of the terminal frame of FIG. 1 but shown at a different angle of perspective.

Referring now to the drawings, particularly FIG. 1, there is shown a terminal frame, designated generally by the numeral 11. The terminal frame 11 includes generally a main frame, designated generally by the numeral 12, and a plurality of clamping straps, designated generally by the numerals 13—13.

The main frame 12 is integrally molded from suitable insulating plastic material, such as acrylonitrile-butadiene-styrene copolymer having relatively high shock resistance and relatively high impact strength. The main frame 12 is in a form of a box-like structure which includes generally, two sides 14 and 15, two ends 16 and 17, a step-down strip 20 and three parallel, spaced bridging members 21, 22 and 23. The bridging members 21, 22 and 23 extend transversely of the main frame 12 between the ends 16 and 17 and are formed integrally therewith. The bridging member 23 is also formed integrally with the side 15. The bridging members 21, 22 and 23 are provided with barriers 24—24 which are formed integrally therewith. The barriers 24—24 rise above the upper surface of the bridging members 21, 22 and 23 in parallel relationship to the sides 14 and 15, so that the bridging members, the respective ones of the barriers, and the side 15 form three generally U-shaped troughs.

Figures 3, 4, 5, 6:
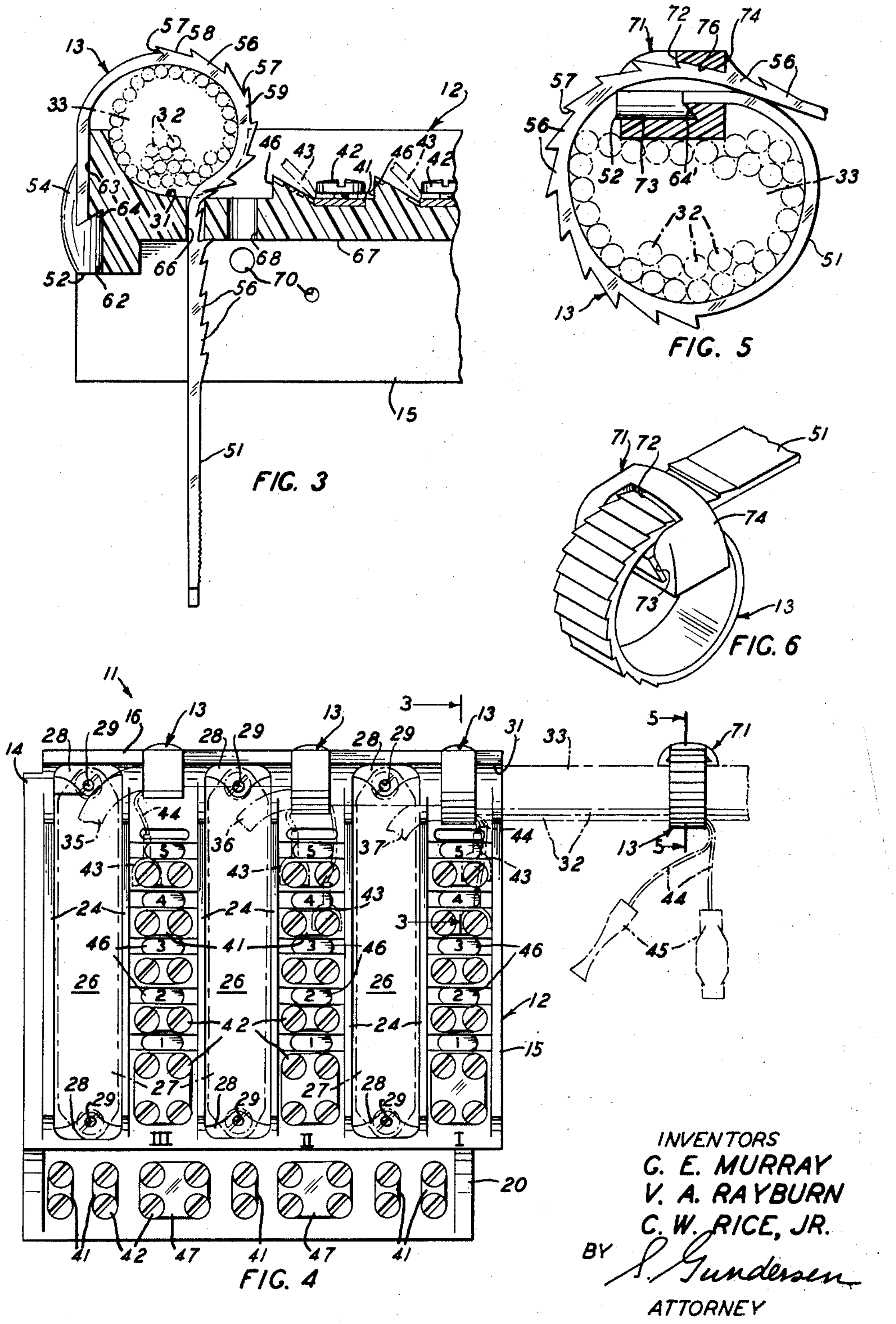
FIG. 3 is an enlarged, fragmentary, cross-sectional view of the frame taken along the plane 3—3 as indicated in FIG. 4.
FIG. 4 is a top plane view of the terminal frame of FIG. 1, but shown in a different, partially assembled state.
FIG. 5 is an enlarged, cross-sectional view of a strap and a buckle taken along a line 5—5 as indicated in FIG. 4.
FIG. 6 is a reduced, perspective view of the strap and the buckle shown in FIG. 5.

The sides 14 and 15, the ends 16 and 17 and the barriers 24—24 also form pockets 26—26 for reception of multiple plug connectors 27—27, which are indicated in phantom lines in FIG. 4, such as "Amphenol" multiple plug connectors manufactured by Amphenol Connector Division of Amphenol-Borg Electronics Corporation, Chicago, Illinois. Ears 28—28, which protrude into the pockets 26—26 from the ends 16 and 17, are provided to receive supportingly the connectors 27—27. The ears 28—28 are provided with bores 29—29 to secure the connectors 27—27 to the respective ears 28—28 with self-tapping screws.

A channel, designated generally by the numeral 31, is formed adjacent to the end 16 and extends transversely of the sides 14 and 15 and the bridging members 21, 22 and 23. The channel 31 is designed to receive therein, transversely of the bridging members 21, 22 and 23 and the pockets 26—26, a bundle of conductors 32—32 (FIG. 3), such as a multiple conductor cable, designated generally by the numeral 33 and shown in phantom lines in FIG. 4. The conductors 32—32 are divided into three individual groups 35, 36 and 37 which are fanned out from the cable 33. The individual conductors 32—32 in each of the groups 35, 36 and 37 are further fanned out and connected to respective ones of the connectors 27—27.

A plurality of paired eyelets 41—41 are imbedded in the step-down strip 20 and the bridging members 21, 22 and 23 to form terminating sections. Screws 42—42 are threadedly received in the eyelets 41—41 for securing spade tips 43—43 of jumper wires 44—44, attached to the cable 33. Some of the jumper wires 44—44 interconnect different pairs of the eyelets 41—41, while the others are connected only at one end to the terminal frame 11, the other end being designed to be connected to other portions of the key telephone set or other apparatus. Such unconnected spade tips of the jumper wires 44—44 are removably insulated by slidable insulating sleeves 45—45.

The barriers 24—24 are provided to insulatingly separate the spade tips 43—43, secured to certain ones of the eyelets 41—41, from adjacent ones of the connectors 27—27 to eliminate the possibility of electrical short circuits between the respective ones of the spade tips and connectors. Sloped bosses 46—46 are formed intermediate the adjacent eyelets 41—41 and integrally with respective ones of the strips 21, 22 and 23, barriers 24—24 and the side 15. The bosses 46—46 are provided for insulatingly separating spade tips of individual jumper wires 44—44, secured to respective ones of the eyelets 41—41, to prevent the possibility of short circuits between the adjacent eyelets. The bosses 46—46 are, preferably, provided with various identification marks molded integrally therewith for identifying different pairs of eyelets 41—41. Electrical conductive bridging plates 47—47 are also provided for interconnecting electrically certain ones of the adjacent eyelets 41—41.

The cable 33 is secured to the main frame 12, by means of the clamping straps 13—13. The clamping straps 13—13 are made of flexible material which is preferably a plastic material, such as polyethylene, nylon, tetrafluoroethylene, ethyl cellulose, or the like. Each of the clamping straps 13—13 includes an elongated strap portion 51, which is substantially rectangular in cross section. A head 52, which has a substantially tenon-like shape, is integrally molded with the strap portion 51 at one end thereof. The head 52 is provided to readily removably secure the clamping strap 13 to the main frame 12 in the manner described hereinbelow. A hump or an enlarged portion 54 reinforcingly interconnects the strap portion 51 and the head 52, to improve bending strength of the clamping strap 13 adjacent the junction of the strap portion 51 and the head 52.

A plurality of oblique, sawtooth-like protuberances 56—56 is formed on the strap portion 51 and spaced longitudinally thereof. Each of the protuberances 56—56 is formed with an inclined shoulder surface 57, facing generally toward the head 52, and an inclined cam surface 58 facing generally toward a free end portion of the strap portion 51. The shoulder surface 57 and the cam surface 58 of each tooth 56 form a deflectable upper portion 59, provided to facilitate assembly of the clamping strap 13 with the frame 12 and to improve binding of the cable 33 to the frame.

The end 16 is provided with a plurality of sockets, designated generally by the numerals 61—61. Each socket 61 includes a mortise-like recess 62 and a recess 63. The sockets 61—61 are formed in the outside surface of the end 16 and substantially in line with the respective ones of the bridging members 21, 22 and 23. Each mortise-like recess 62 is formed complementary with the tenon-like outside configuration of the head 52 of the clamping strap 13 to slidably receive the head therein. Each recess 63 is formed substantially complementary with the strap portion 51 adjacent to the head 52. A step 64 is formed at the junction of the recess 62 with the recess 63. When the head 52 is inserted into the socket 61 and against the step 64, the step cuts into a conjunction of the strap portion 51 and head 52, to assist in retaining the head in the socket in assembled, cable-securing position, shown in FIG. 3.

Each of the bridging members 21, 22 and 23 is provided with slots 66—66, each conforming substantially with the rectangular cross section of the strap portion 51. When it is desired to secure the conductors 32—32 in the groove 31, the head 52 is slid in position into the selected one of the sockets 61—61 and the portion of the strap portion 51 adjacent to the head is lodged in the recess 63. The strap portion 51 is then bent around the conductors 32—32, received in the channel 31, and the free end of the strap portion is inserted through the corresponding one of the slots 66—66, so as to form a loop about the conductors. The individual slots 66—66 are spaced in the channel 31 different distances from the respective, associated sockets 61—61 in order to allow forming different size loops about diminishing numbers of groups 35, 36 and 37 of the conductors 32—32.

As the free end of the strap portion 51 is being advanced through the slot 66, the cam surface 58 of each consecutive protuberance 56 serves to slightly expand the slot 66 and to compress the protuberance. The projecting, upper portion 59 of the protuberance 56 is deflected by the walls of the associated one of the slots 66—66 toward the adjacent surface of the strap portion 51 to facilitate passage of the strap portion and the protuberance through the slot. After the protuberance 56 passes through the slot 66, the shoulder surface 57 thereof faces the surface 67 of the main frame 12 adjacent to the respective one of the slots 66—66 to resist reverse movement of the strap portion 51 through the slot 66. The upper portion 59 of the protuberance 56 resiliently resists the reverse movement and is deflected in the opposite direction until the shoulder surface 57 is substantially parallel to the surface 67 of the main frame 12 and presents the substantially large locking surface thereto. The advancement of the free end of the strap portion 51 is continued until the head 52 abuts against the step 64, which interferes with any further reduction of the loop about the conductors 32—32. At this time the strap portion 51 fits relatively closely about the conductors which are now secured to the main frame 12. The clamping strap 13 may be easily applied to and readily adjusted in a reducing sense for snugly retaining cables and groups of conductors of various diameters. The free end portion of the strap portion 51, extending through the slot 66 beyond the respective one of the bridging members 21, 22 and 23, may be subsequently cut off and discarded.

The terminal frame is also provided with apertures 68—68 in the end 16 and with slots 69—69 in the bridging members 21, 22 and 23 to allow passage of conductors to and from the eyelets 41—41 in the step-down strip 20 and the bridging members 21, 22 and 23 to and from the other parts of apparatus (not shown). A plurality of apertures 70—70 are provided in the sides 14 and 15 to secure the main frame 12 into position in the key telephone set (not shown) by suitable means, such as bolts and nuts or self-tapping screws.

The conductors 32—32, including certain ones of the jumper wires 44—44, which extend beyond the main frame 12, are bundled together by means of one of the clamping straps 13—13 and a buckle, designated generally by the numeral 71, shown in FIGS. 4, 5 and 6. The buckle 71 is provided with an aperture 72 which has a mortise-like socket recess 73. The socket recess 73 is complementary with the tenon-like configuration of the head 52 of the clamping strap 13 and is designed to removably secure the head to the buckle 71. When it is desired to clamp a plurality of the conductors 32—32 together, the free end of the strap portion 51 is threaded through the aperture 72 from left to right, as viewed in FIG. 5. The head 52 is then slid into place in the socket recess 73, the strap portion 51 is bent about the conductors 32—32, and the free end of the strap portion after encircling the conductors is again threaded through the aperture 72 so that the strap portion 51 overlaps the head 52. As each protuberance 56 is advanced through the aperture 72, the shoulder surface 57 of each consecutive protuberance interlocks with a front surface 74 of the buckle 71 in the manner described hereinabove with respect to the main frame 12.

The aperture 72 is also provided with an inclined surface 76 which reduces the height of the aperture 72 adjacent to the right, exit end, as viewed in FIG. 5, of the aperture to substantially twice the thickness of the rectangular cross section of the strap portion 51. The angle of inclination of the surface 76 is so selected that when the head 52 of the clamping strap 13 is in position in the socket recess 73 in abutment with the step 64', a passage exists between the clamping strap 13 and the surface 76, which is throughout its length substantially equal to the mean thickness of the rectangular cross section of the protuberance 56. The surface 76 is designed to prevent accidental disengagement of the shoulder surface 57 from the front surface 74 and resultant loosening of the clamping strap 13 to ensure interlocking of the shoulder surface 57 and the front surface 74 of the buckle 71.

The design of the terminal frame 11, arrangement and cooperation of individual parts thereof greatly facilitates assembly of the multiple conductor cable 33 with the main frame 12 and of the main frame with telephone sets. Possibility of short circuits between adjacent spade tips of conductors and between spade tips of conductors and adjacent connectors is greatly reduced, if not eliminated. The cable 33, whether in a single group or in a desired combination of groups of conductors 32—32, is quickly and efficiently secured to the main frame 12. The conductors 32—32 of the cable 33, adjacent to the main frame 12, and loose, unconnected ends of the jumper wires 44—44 are also quickly and efficiently bound into a neat bundle by the clamping strap 13, which is secured thereabout by the buckle 71. Only one type of the clamping strap 13 is used with both the main frame 12 and the buckle 71.

It is to be understood that the above-described arrangements are simply illustrative of the application of the principles of the invention. Other arrangements may be devised by those skilled in the art, which will embody the principles of the invention and fall within the spirit and scope of the invention.

What is claimed is:

1. A two-element clamp for bundling conductors of a cable, which comprises an elongated, flexible strap and a relatively rigid buckle formed with an opening extending centrally therethrough, the strap having a first end portion of substantially uniform cross section and an enlarged head at the other end portion of the strap, one wall of the central opening of the buckle having a socket for complementarily receiving the enlarged head therein to removably secure the strap to the buckle, the buckle opening formed for receiving the first end portion of the strap therethrough so that the strap completely surrounds the cable conductors to form a closed loop thereabout, the strap also having a plurality of deflectable locking means spaced along the strap intermediate said first end portion and the enlarged head for engaging consecutively a wall of the buckle opening opposite the socket wall to form reducingly adjustable secured loops for bundling wire or cables.

2. A two-component clamp for bundling conductors of a cable, which comprises an elongated, flexible strap and a relatively rigid buckle, the strap having a first end portion of substantially uniform cross section and a head having a tenon-like shape at the other end portion of the strap, the buckle having an aperture extending therethrough, the aperture including a recess in one face of the buckle and a slot in the opposite face of the buckle, the slot communicating with the recess, the recess having a mortise-like shape to receive readily removably the head therein for removably securing the head to the buckle, the slot being designed for receiving therein a portion of the strap immediately adjacent to the head and, after the strap is bent in a loop around a group of conductors, also to receive therethrough said first end in overlapping relationship with the head and with said adjacent portion of the strap, the loop being reducingly adjustable about the conductors by advancing said first end in the direction of insertion, the slot being of such a size that the free end of the strap is receivable relatively fittingly therein, a plurality of projecting locking means spaced on the strap intermediate the head and said first portion, the locking means being deflectable as an incident of passage through the slot, the consecutive locking means interlockingly engaging a surface of the buckle adjacent to the slot and facing in direction of insertion of said free end to lock the strap against reverse movement to form secured loops about the conductors.

3. A terminal frame for a cable having a plurality of conductors, which comprises a block of insulating material having an open channel for receiving the cable therein, the block formed with a socket on the outer wall of the channel and an aperture at the base of the channel extending through the block, means on the block for forming terminations for a plurality of conductors of the cable, and a flexible strap detachably secured at one end thereof with the socket and detachably secured at the opposite end thereof within the aperture, whereby the strap forms a loop about a selected group of the cable conductors, the size of the loop being reducingly adjustable to form a relatively closely fitting loop about the group of cable conductors to secure the cable conductors to the block.

4. A terminal frame for a cable having a plurality of conductors, which comprises a block of insulating material having an open channel for receiving the cable therein, means spacially and integrally formed with the block for providing terminations for selected conductors of the cable, means for receiving a plurality of connectors between the spacially formed conductor termination means whereby each connector provides terminations for individual groups of conductors of the cable, the block formed with a plurality of mortise-like sockets along one outer edge thereof adjacent to the cable receiving channel and a corresponding plurality of slots formed in the base of the channel extending through the block adjacent to the sockets, and a plurality of flexible straps each having a tenon-like shape at one end thereof secured within the corresponding plurality of mortise-like sockets of the block and looped about groups of the conductors with the opposite end of the strap having saw-tooth-like protuberances lockingly secured within the slots of the channel adjacent to the corresponding socket whereby the size of the individual loops is reducingly adjustable to form relatively closely fitting loops about the groups of conductors to secure the conductors to the block.

5. A terminal frame for cable having a plurality of conductors, which comprises a block of insulating material formed in a box-like structure having two sides and two ends, a plurality of parallel spaced bridging members formed integrally with the block transverse the ends thereof, the block formed with eyelets in the bridging members for providing terminations of selected conductors, sloped bosses formed integrally with and transverse to the bridging members for insulatingly separating adjacent eyelets, barriers formed integrally on each side of the bridging members to form pockets between the bridging members for receiving connectors therein and for insulatingly separating the connectors from the eyelets of the bridging members, a channel extending transversely of the sides at one end of the block for receiving the cable therein, the block formed with a plurality of sockets along the outer end adjacent to the channel wherein each socket is formed with a mortise-like recess adjacent to a stepped recess whereby a shoulder is formed therebetween, the block formed with a corresponding plurality of slots in the channel adjacent to the sockets, a flexible strap having a tenon-like shape at one end and saw-tooth-like protuberances at the opposite end wherein the tenon shaped end is secured within the mortise-like recesses of the block sockets and abuts the shoulder therein and the saw-tooth-like protuberances are lockingly secured within the slots of the channel whereby loops of the strap are formed about selected groups of the cable conductors, the size of the individual loops being reducingly adjustable to form a relatively closely fitting group about the cable conductors to secure the conductors to the block.

References Cited in the file of this patent

UNITED STATES PATENTS

| | | |
|---|---|---|
| 1,517,017 | Roth | Nov. 25, 1914 |
| 1,716,531 | Persons | June 11, 1929 |
| 3,055,971 | Lander | Sept. 25, 1962 |

FOREIGN PATENTS

| | | |
|---|---|---|
| 1,123,839 | France | June 11, 1956 |
| 599,050 | Great Britain | Mar. 3, 1948 |
| 708,528 | Germany | July 23, 1941 |